United States Patent
Fang et al.

(10) Patent No.: US 11,954,870 B2
(45) Date of Patent: Apr. 9, 2024

(54) DYNAMIC SCENE THREE-DIMENSIONAL RECONSTRUCTION METHOD, APPARATUS AND SYSTEM, SERVER, AND MEDIUM

(71) Applicant: Tsinghua University, Beijing (CN)

(72) Inventors: Lu Fang, Shenzhen (CN); Mengqi Ji, Shenzhen (CN); Yebin Liu, Shenzhen (CN); Lan Xu, Shenzhen (CN); Wei Cheng, Shenzhen (CN); Qionghai Dai, Shenzhen (CN)

(73) Assignee: TSINGHUA UNIVERSITY, Beijing (CN)

( * ) Notice: Subject to any disclaimer, the term of this patent is extended or adjusted under 35 U.S.C. 154(b) by 715 days.

(21) Appl. No.: 16/975,242

(22) PCT Filed: Apr. 23, 2019

(86) PCT No.: PCT/CN2019/083816
§ 371 (c)(1),
(2) Date: Nov. 20, 2020

(87) PCT Pub. No.: WO2019/161813
PCT Pub. Date: Aug. 29, 2019

(65) Prior Publication Data
US 2021/0074012 A1    Mar. 11, 2021

(30) Foreign Application Priority Data
Feb. 23, 2018 (CN) .......................... 201810155616.4

(51) Int. Cl.
G06T 7/593 (2017.01)
B64C 39/02 (2023.01)
(Continued)

(52) U.S. Cl.
CPC ............ G06T 7/292 (2017.01); B64C 39/024 (2013.01); G06T 7/593 (2017.01); G06T 17/00 (2013.01);
(Continued)

(58) Field of Classification Search
CPC ......... G06T 7/292; G06T 7/593; G06T 17/00; G06T 2207/10028; G06T 2207/20221;
(Continued)

(56) References Cited

U.S. PATENT DOCUMENTS

2017/0046873 A1* 2/2017 Terry ................... H04N 13/275
2018/0046187 A1* 2/2018 Martirosyan .......... B64D 47/08
(Continued)

FOREIGN PATENT DOCUMENTS

CN   105184863   12/2015
CN   105225241   1/2016
(Continued)

OTHER PUBLICATIONS

Wei et al. "3D Modeling Based on Multiple Unmanned Aerial Vehicles with the Optimal Paths." International Symposium on Intelligent Signal Processing and Communication Systems, Oct. 24, 2016 (Year: 2016).*

(Continued)

Primary Examiner — Jon Chang
(74) Attorney, Agent, or Firm — Woodard, Emhardt, Henry, Reeves & Wagner, LLP (57) ABSTRACT

Provided are a three-dimensional reconstruction method, apparatus and system of a dynamic scene, a server and a medium. The method includes: acquiring multiple continuous depth image sequences of the dynamic scene, where the multiple continuous depth image sequences are captured by an array of drones equipped with depth cameras; fusing the multiple continuous depth image sequences to establish a
(Continued)

three-dimensional reconstruction model of the dynamic scene; obtaining target observation points of the array of drones through calculation according to the three-dimensional reconstruction model and current poses of the array of drones; and instructing the array of drones to move to the target observation points to capture, and updating the three-dimensional reconstruction model according to multiple continuous depth image sequences captured by the array of drones at the target observation points.

20 Claims, 5 Drawing Sheets

(51) Int. Cl.
    *B64U 101/30* (2023.01)
    *G06T 7/292* (2017.01)
    *G06T 17/00* (2006.01)
    *G06V 10/80* (2022.01)
    *G06V 20/13* (2022.01)
    *G06V 20/17* (2022.01)
    *G06V 20/64* (2022.01)

(52) U.S. Cl.
    CPC ............ *G06V 10/803* (2022.01); *G06V 20/13* (2022.01); *G06V 20/17* (2022.01); *G06V 20/653* (2022.01); *B64U 2101/30* (2023.01); *G06T 2207/10028* (2013.01); *G06T 2207/20221* (2013.01)

(58) Field of Classification Search
    CPC . G06T 2207/10016; G06T 2207/10032; G06T 2207/30244; G06T 7/596; G06V 10/803; G06V 20/13; G06V 20/17; G06V 20/653; B64C 39/024; B64U 2101/30; G06F 18/251

See application file for complete search history.

(56) References Cited

U.S. PATENT DOCUMENTS

2018/0089622 A1* 3/2018 Burch, V ............... B64U 50/19
2019/0377345 A1* 12/2019 Bachrach ............. G05D 1/0094

FOREIGN PATENT DOCUMENTS

| CN | 106698762 | 6/2016 |
| CN | 105786016 | 7/2016 |
| CN | 106780729 | 5/2017 |
| CN | 108335353 | 7/2018 |

OTHER PUBLICATIONS

International Search Report for PCT/CN2019/083816 dated Jul. 10, 2019.
Keller et al.: "Real-time 3D Reconstruction in Dynamic Scenes using Point-based Fusion", International Conference on 3D Vision, 2013.
Shaoqiang: "Research on Algorithm of 30 Reconstruction Based on Stereo Vision", Thesis submitted to Tianjin University of Technology, 2015.
Xu et al.: "FlyCap: Markerless Motion Capture Using Multiple Autonomous Flying Cameras", IEEE, 2017.
Zhao, et al: "The Application of Improved ICP Algorithm in Point Cloud Registration and Fusion Which Based on Multiple Sets of Images", Software, 2014.

* cited by examiner

DYNAMIC SCENE THREE-DIMENSIONAL RECONSTRUCTION METHOD, APPARATUS AND SYSTEM, SERVER, AND MEDIUM

This is a National Stage Application filed under 35 U.S.C. 371 based on International Patent Application No. PCT/CN2019/083816, filed Apr. 23, 2019, which claims priority to Chinese Patent Application No. 201810155616.4 filed Feb. 23, 2018, the disclosures of both of which are incorporated herein by reference in their entireties.

TECHNICAL FIELD

Embodiments of the present disclosure relate to the technical field of computer vision, for example, to a three-dimensional reconstruction method, apparatus and system of a dynamic scene, a server, and a medium.

BACKGROUND

As consumer-level depth cameras are becoming increasingly popular, and especially the latest Iphone X has a built-in depth camera based on structured light, such that it is possible to apply virtual reality and mixed reality based on dynamic three-dimensional reconstruction, which has a wide application prospect and important application value.

Relevant three-dimensional reconstruction methods of a dynamic scene usually rely on expensive laser scanners. Although the accuracy is high, the scanning process relies on additional wearable sensors, which impairs the comfort of capturers. In addition, a camera array system may also be used for implementing the three-dimensional reconstruction of a dynamic scene. However, such method is limited by a fixed camera array, so the capturing space is very limited, and additional human resources are needed to control capturing cameras and select capturing viewpoints, therefore the reconstruction process cannot be completed fully automatically.

SUMMARY

The embodiments of the present disclosure provide a three-dimensional reconstruction method, apparatus and system of a dynamic scene, a server and a medium, so as to overcome the defect of how to automatically complete the three-dimensional reconstruction of a dynamic scene under the condition of not affecting the comfort of a capturer and not being limited by capturing space.

In a first aspect, an embodiment of the present disclosure provides a three-dimensional reconstruction method of a dynamic scene. The method includes steps described below.

Multiple continuous depth image sequences of the dynamic scene are acquired, where the multiple continuous depth image sequences are captured by an array of drones, where each drone is equipped with a depth camera.

The multiple continuous depth image sequences are fused to establish a three-dimensional reconstruction model of the dynamic scene.

Target observation points of the array of drones are calculated according to the three-dimensional reconstruction model and current poses of the array of drones.

The array of drones is instructed to move to the target observation points to capture, and the three-dimensional reconstruction model is updated according to multiple continuous depth image sequences captured by the array of drones at the target observation points.

In a second aspect, an embodiment of the present disclosure further provides a three-dimensional reconstruction apparatus of a dynamic scene. The apparatus includes an image sequence acquisition module, an image fusion module, a target observation point calculation module, and a reconstruction model update module.

The image sequence acquisition module is configured to acquire multiple continuous depth image sequences of the dynamic scene, where the multiple continuous depth image sequences are captured by an array of drones, where each drone is equipped with a depth camera.

The image fusion module is configured to fuse the multiple continuous depth image sequences to establish a three-dimensional reconstruction model of the dynamic scene.

The target observation point calculation module is configured to calculate target observation points of the array of drones according to the three-dimensional reconstruction model and current poses of the array of drones.

The reconstruction model update module is configured to instruct the array of drones to move to the target observation points to capture, and update the three-dimensional reconstruction model according to multiple continuous depth image sequences captured by the array of drones at the target observation points.

In a third aspect, an embodiment of the present disclosure further provides a three-dimensional reconstruction system of a dynamic scene. The system includes an array of drones and a three-dimensional reconstruction platform.

Each drone in the array of drones is equipped with a depth camera, and the depth camera is configured to capture a depth image sequence of the dynamic scene.

The three-dimensional reconstruction platform includes the three-dimensional reconstruction apparatus of the dynamic scene described in any embodiment of the present disclosure, and is configured to generate a three-dimensional reconstruction model of the dynamic scene according to multiple continuous depth image sequences captured by the array of drones.

In a fourth aspect, an embodiment of the present disclosure further provides a server. The server includes one or more processors and a storage device.

The storage device is configured to store one or more programs.

The one or more programs, when executed by the one or more processors, cause the one or more processors to implement the three-dimensional reconstruction method of the dynamic scene described in any embodiment of the present application.

In a fifth aspect, an embodiment of the present disclosure further provides a computer-readable storage medium storing a computer program, where the program, when executed by a processor, implements the three-dimensional reconstruction method of the dynamic scene described in any embodiment of the present application.

DETAILED DESCRIPTION

The present application will be further described in detail in conjunction with the drawings and embodiments. It is to be understood that the embodiments set forth herein are intended to explain but not to limit the present application. It is to be additionally noted that for ease of description, only part, not all, of structures related to the present application are illustrated in the drawings.

Embodiment One

Figure 1:
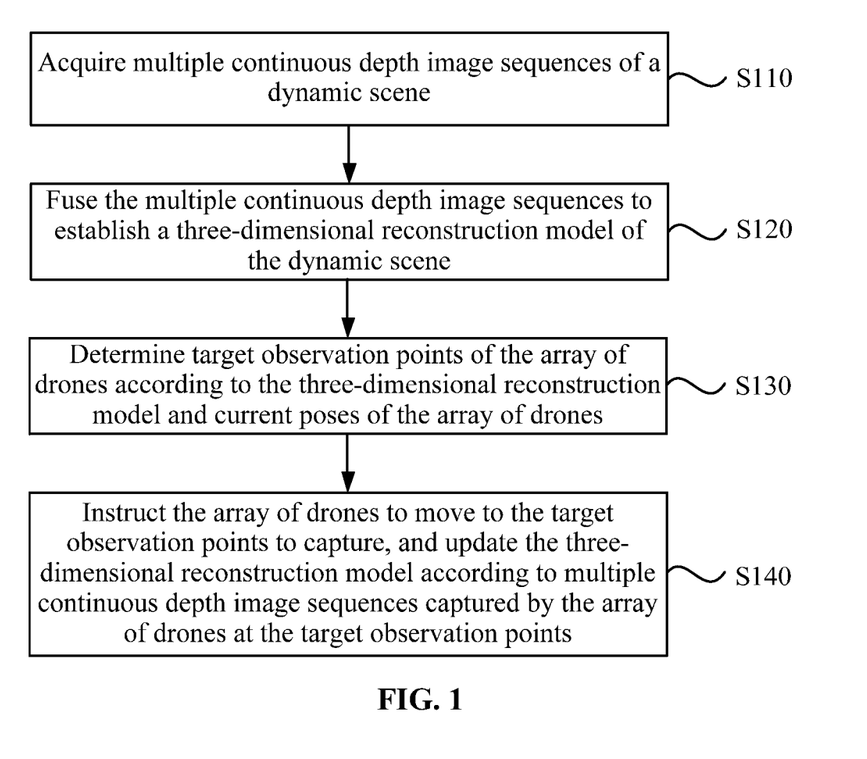
FIG. 1 is a flowchart of a three-dimensional reconstruction method of a dynamic scene according to embodiment one of the present disclosure.

FIG. 1 is a flowchart of a three-dimensional reconstruction method of a dynamic scene according to embodiment one of the present disclosure. This embodiment may be applied to the case of three-dimensional reconstruction of a dynamic scene. The dynamic scene, for example, is a scene where a dancer is dancing on a stage. The method may be executed by a three-dimensional reconstruction apparatus of a dynamic scene. The apparatus may be implemented by software and/or hardware, and may be integrated in a server. As shown in FIG. 1, the method, for example, may include step S110 to step S140.

In step S110, multiple continuous depth image sequences of the dynamic scene are acquired.

The multiple continuous depth image sequences are captured by an array of drones equipped with depth cameras.

The array of drones may include multiple drones, such as 3 or 5 drones, which may, for example, be configured according to actual requirements of the dynamic scene, and are not limited in the embodiment of the present disclosure in any way. Different drones in the array of drones may be located at different viewpoints to capture the dynamic scene at the same time, thus acquiring depth image sequences of the dynamic scene from different angles, so as to better perform three-dimensional reconstruction.

Each drone is equipped with a depth camera for capturing depth images of the dynamic scene. The depth image is an image or image channel including information related to a distance to a scene object surface of a viewpoint. Each pixel value in the depth image is an actual distance between the camera and an object, and a three-dimensional model may be constructed through the distance. Capturing through the array of drones equipped with depth cameras will not be restricted by capturing space as the array of fixed cameras in the related art. Moreover, the array of drones may also be controlled to perform capturing automatically.

Initially, the array of drones may be controlled to be located at initial positions above the dynamic scene and perform capturing at the same time. Since three-dimensional reconstruction is to be performed on the dynamic scene, and a position or pose of a character or scenery in the dynamic scene changes in real time, each drone will continuously perform capturing and send the captured continuous depth image sequence in real time to the three-dimensional reconstruction apparatus for processing. The continuous depth image sequence refers to a depth image sequence captured continuously in the order of time. Generally, the depth camera may continuously capture 30 frames of images per second, and each image is arranged in the order of time to obtain an image sequence.

In an embodiment, the step in which the multiple continuous depth image sequences of the dynamic scene are acquired includes steps described below.

Multiple original depth image sequences of the dynamic scene captured by the array of drones are acquired.

The multiple original depth image sequences are aligned according to a synchronization timestamp to obtain the multiple continuous depth image sequences.

The multiple original depth image sequences are original image sequences respectively captured by different drones. Although the array of drones performs capturing at the same time, a certain error in time will exist. Therefore, these original depth image sequences need to be aligned according to the synchronization timestamp, so as to ensure the consistency in time of the depth image sequences captured by different drones from different angles of view. In this way, the accuracy of the reconstruction model can be improved.

In step S120, the multiple continuous depth image sequences are fused to establish a three-dimensional reconstruction model of the dynamic scene.

In an embodiment, continuous depth image sequences may be projected into three-dimensional space according to an intrinsic parameter matrix of the depth camera to obtain a three-dimensional point cloud, and then the three-dimensional point cloud is registered and fused to finally establish the three-dimensional reconstruction model. During implementation, registration and fusion algorithms in the related art may be used, and details are not repeated here.

In step S130, target observation points of the array of drones are determined according to the three-dimensional reconstruction model and current poses of the array of drones.

As a position or pose of a character or scenery in the dynamic scene changes in real time, how to make the array of drones perform capturing at the most suitable positions according to the changes of the dynamic scene is an important issue that determines the effect of the reconstruction model. Therefore, in the embodiment of the present disclosure, the target observation points of the array of drones at the next moment are calculated in real time, where the target observation points are the best observation points, so that the array of drones is instructed in real time to move to the target observation points to capture, thus updating the reconstruction model and achieving accurate reproduction of the dynamic scene.

The pose may be expressed by a rotation angle and translation distance of a drone, and correspondingly, there also are two parameters, rotation and translation, for controlling the drone. When the target observation points are determined, the drone may be controlled to move to the best target observation point, and the rotation angle of the drone from a current observation point to the target observation point is controlled, i.e., the best capturing viewpoint of the drone is controlled. The determination of the target observation points may include that the possible capturing points of the drone are evaluated according to a preset standard and capturing points whose evaluation result meets the standard are determined as the best target observation points. The possible capturing points may be determined according to the current poses of the array of drones. The evaluation process may be performed according to the possible observation points and the established three-dimensional reconstruction model, so as to evaluate among different possible observation points, according to which observation point the effect of the three-dimensional reconstruction model established by the captured depth image sequences meets the preset standard. For example, the evaluation can be performed through calculating an energy function of the possible observation points.

In step S140, the array of drones is instructed to move to the target observation points to capture, and the three-dimensional reconstruction model is updated according to multiple continuous depth image sequences captured by the array of drones at the target observation points.

In the technical scheme of this embodiment, the array of drones is used for capturing the dynamic scene, and image fusion is performed according to the captured multiple continuous depth image sequences to obtain the three-dimensional reconstruction model of the dynamic scene, so that there is no need to rely on an additional device, and the comfort of the capturer is ensured. Moreover, in the process of reconstruction, the array of drones is instructed in real time, through calculating the target observation points, to move to the target observation points to capture, and the model is updated according to the multiple continuous depth image sequences captured by the array of drones at the target observation points, so as to obtain a more accurate three-dimensional reconstruction model. The method is not restricted by the capturing space, and the reconstruction process can be automatically completed.

Embodiment Two

Figure 2:
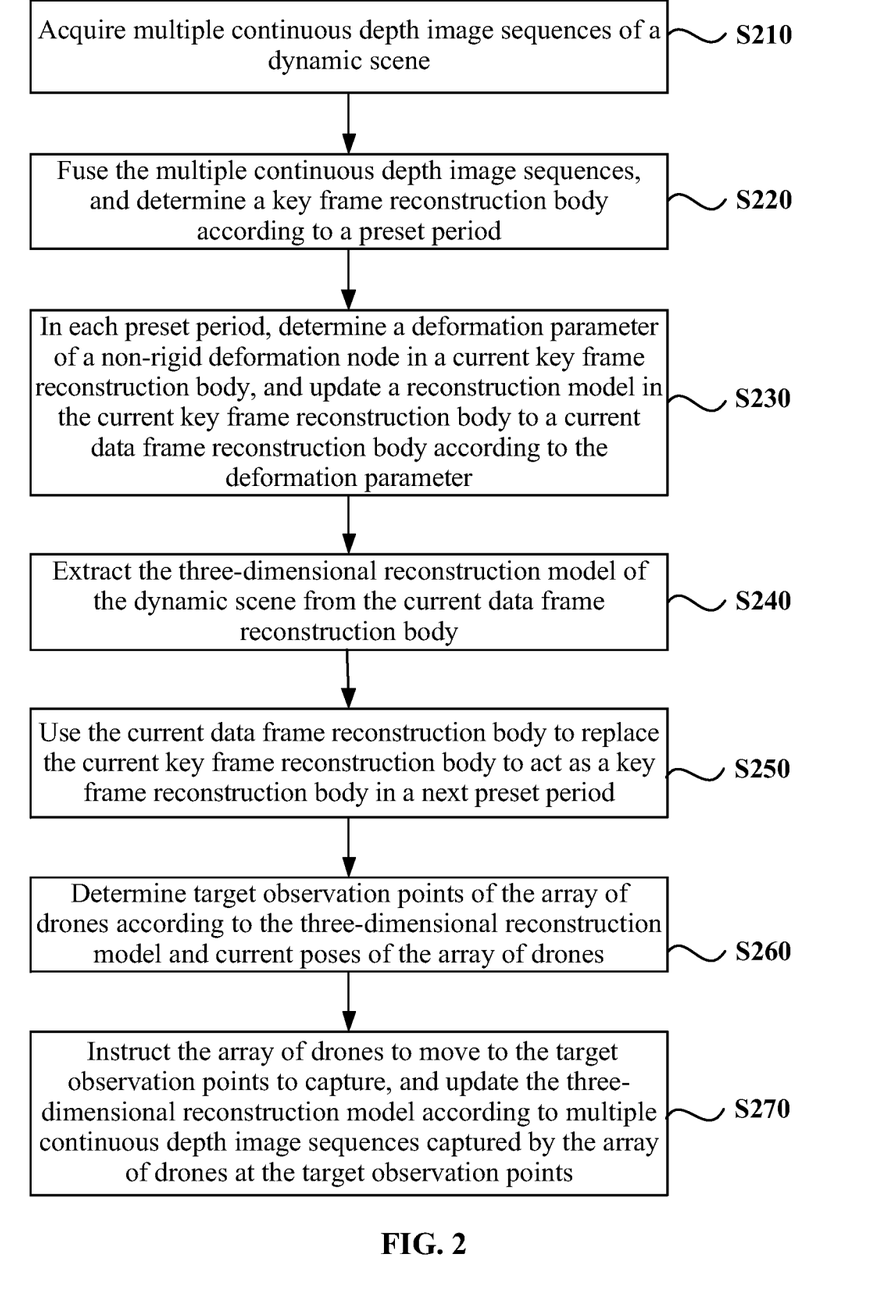
FIG. 2 is a flowchart of a three-dimensional reconstruction method of a dynamic scene according to embodiment two of the present disclosure.

FIG. 2 is a flowchart of a three-dimensional reconstruction method of a dynamic scene according to embodiment two of the present disclosure. As shown in FIG. 2, the method, for example, may include step S210 to step S270.

In step S210, multiple continuous depth image sequences of the dynamic scene are acquired.

The multiple continuous depth image sequences are captured by an array of drones equipped with depth cameras.

In step S220, the multiple continuous depth image sequences are fused, and a key frame reconstruction body is determined according to a preset period.

In step S230, in each preset period, a deformation parameter of a non-rigid deformation node in a current key frame reconstruction body is determined, and a reconstruction model in the current key frame reconstruction body is updated to a current data frame reconstruction body according to the deformation parameter.

The current data frame reconstruction body refers to a real-time reconstruction body at each moment.

In step S240, the three-dimensional reconstruction model of the dynamic scene is extracted from the current data frame reconstruction body.

In step S250, the current data frame reconstruction body is used to replace the current key frame reconstruction body to act as a key frame reconstruction body in a next preset period.

In steps S220 to S250, actually, the depth images are fused by using a key frame strategy and the real-time reconstruction model of the dynamic scene is obtained.

In an embodiment, an initial three-dimensional reconstruction model may be established by image fusion of multiple continuous depth image sequences, then the key frame reconstruction body of the three-dimensional reconstruction model is determined according to a preset period, e.g., 100 frames, and the operations of steps S230 to S250 are performed in each preset period. The non-rigid deformation node may represent a node where a character or scenery in the dynamic scene changes. The deformation parameter of the non-rigid deformation node is determined so that the reconstruction model in the current key frame reconstruction body is updated to the current data frame reconstruction body, and thereby the three-dimensional reconstruction model is extracted from the current data frame reconstruction body. Therefore, change details of the dynamic scene can be captured, the accuracy of the reconstruction model can be improved, errors and confusion can be avoided, and stutter can also be avoided. Finally, the current data frame reconstruction body is used to replace the current key frame reconstruction body to act as the key frame reconstruction body in the next preset period, thus achieving the reproduction of each dynamically changing scene in the dynamic scene through the iteration of the current data frame reconstruction body and the key frame reconstruction body.

The reconstruction body may be understood as an assumption in the process of three-dimensional reconstruction. It is assumed that the reconstruction body may surround the entire dynamic scene (or reconstruction object) and is formed by multiple uniform voxels. Through registration, fusion and other algorithms, the three-dimensional reconstruction model of the dynamic scene is established on the reconstruction body. The node in the reconstruction body and the deformation parameter of the node characterize the features of the dynamic scene, so the three-dimensional reconstruction model of the dynamic scene can be extracted from the reconstruction body. In this embodiment, the depth images are fused through the above key frame strategy, so that errors generated in data fusion when point cloud registration is inaccurate are avoided.

The deformation parameter includes rotation and translation parameters of each deformation node, and the calculation process may be obtained, for example, by solving an energy equation of non-rigid motion. The energy equation is formed by a non-rigid motion constraint term and a local rigid motion constraint term which are respectively expressed by the following formulas:

$$E_n = \sum_{(v_i, u_i) \in c_i} |\hat{n}_{v_i}(\hat{v}_i - u_i)|^2$$

$$E_g = \sum_i \sum_{j \in N(i)} \|T_{v_i} v_j - T_{v_j} v_j\|^2$$

In non-rigid motion constraint term $E_n$, $\hat{v}_i$ and $\hat{n}_{v_i}$ respectively denote vertex coordinates and normal directions of the model driven by non-rigid motion, $u_i$ denotes position coordinates of three-dimensional point cloud in a same matching point pair, $c_i$ denotes the i-th element in a matching point pair set, and $\tilde{v}_i$ and $\tilde{n}_{v_i}$ respectively denote the vertex coordinates and normal directions of the model driven by non-rigid motion. The non-rigid motion constraint term E ensures that the model driven by non-rigid motion is aligned as much as possible with the three-dimensional point cloud obtained from the depth images.

In local non-rigid motion constraint term $E_g$, i denotes the i-th vertex on the model, $N$ (i) denotes a set of adjacent vertices around the i-th vertex on the model, $T_{v_i}$ and $T_{v_j}$ respectively denote driving effects of the known non-rigid motion on the vertices $v_i$ and $v_j$ on a model surface, and $T_{v_i} v_j$ and $T_{v_j} v_j$ respectively denote position transformation effects where the non-rigid motion acting on $v_i$ and $v_j$ simultaneously acts on $v_j$, that is, it is ensured that the non-rigid driving effects of adjacent vertices on the model should be consistent as much as possible.

The non-rigid motion constraint term $E_n$ ensures that the model driven by non-rigid motion is aligned as much as possible with the three-dimensional point cloud obtained from the depth images, and the local rigid motion constraint term $E_g$ may ensure that a relatively large magnitude of reasonable non-rigid motion may be well solved while enables the entire model to be subjected to local rigid constraint motion. In order to use an exponential mapping method, the deformed vertex is approximated as follows:

$$\hat{v}_i = T_{v_i} v_i = (I + \hat{\xi}) TP_{v_i} v_i.$$

Here, $TP_{v_i}$ is a cumulative transformation matrix of vertex $v_i$ of the model up to the previous frame and is a known quantity; I is a four-dimensional unit array $$\hat{\xi} = \begin{bmatrix} 0 & -w_z & w_y & v_1 \\ w_z & 0 & -w_x & v_2 \\ -w_y & w_x & 0 & v_3 \\ 0 & 0 & 0 & 1 \end{bmatrix},$$

and let $TP_{v_i} v_i = p$, that is, the vertex of the model after the transformation of the previous frame is transformed as follows:

$$(I + \hat{\xi})$$

$$p = \begin{bmatrix} 1 & -w_z & w_y & v_1 \\ w_z & 1 & -w_x & v_2 \\ -w_y & w_x & 1 & v_3 \\ 0 & 0 & 0 & 1 \end{bmatrix} \begin{pmatrix} p_x \\ p_y \\ p_z \\ 1 \end{pmatrix} = \begin{bmatrix} 1 & 0 & 0 & 0 & p_z & -p_y \\ 0 & 1 & 0 & -p_z & 0 & p_x \\ 0 & 0 & 1 & p_y & -p_x & 0 \end{bmatrix} \begin{pmatrix} v_1 \\ v_2 \\ v_3 \\ w_x \\ w_y \\ w_z \end{pmatrix}.$$

For each vertex, unknown parameters to be solved are a six-dimensional transformation parameter $x=(v_1, v_2, v_3, w_x, w_y, w_z)^T$.

In step S260, target observation points of the array of drones are determined according to the three-dimensional reconstruction model and current poses of the array of drones.

In step S270, the array of drones is instructed to move to the target observation points to capture, and the three-dimensional reconstruction model is updated according to multiple continuous depth image sequences captured by the array of drones at the target observation points.

In the technical scheme of this embodiment, the array of drones is used for capturing the dynamic scene, image fusion is performed according to the captured multiple continuous depth image sequences, and the key frame strategy is adopted, so as to finally obtain the three-dimensional reconstruction model of the dynamic scene, improving the accuracy of the reconstruction model and avoiding the error caused by inaccurate point cloud registration based on automatically completing the reconstruction process and not being restricted by the capturing space. Meanwhile, there is no need to rely on an additional device, and the comfort of the capturer is ensured.

Embodiment Three

Figure 3:
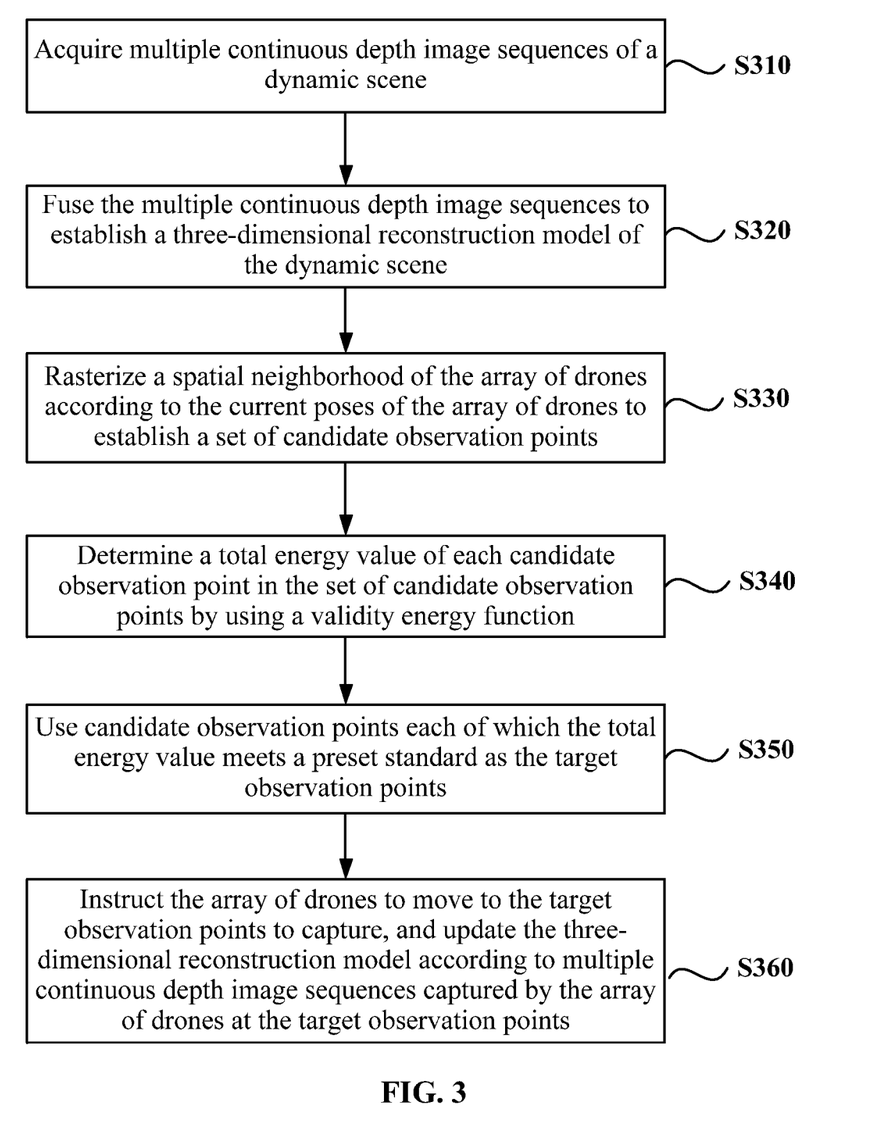
FIG. 3 is a flowchart of a three-dimensional reconstruction method of a dynamic scene according to embodiment three of the present disclosure.

FIG. 3 is a flowchart of a three-dimensional reconstruction method of a dynamic scene according to embodiment three of the present disclosure. This embodiment further optimizes the calculation operation of target observation points on the basis of the above embodiments. As shown in FIG. 3, the method, for example, may include step S310 to step S360.

In step S310, multiple continuous depth image sequences of the dynamic scene are acquired.

The multiple continuous depth image sequences are captured by an array of drones equipped with depth cameras.

In step S320, the multiple continuous depth image sequences are fused to establish a three-dimensional reconstruction model of the dynamic scene.

In step S330, a spatial neighborhood of the array of drones is rasterized according to the current poses of the array of drones to establish a set of candidate observation points.

The current poses of the array of drones characterize a current observation viewpoint of each drone in the array of drones, including current coordinates, capturing angles, etc. A spatial neighborhood range is delimited according to the current poses and preset distances, and the candidate observation points are determined in a manner of rasterizing the spatial neighborhood, that is, each rasterized node represents a candidate observation point.

In step S340, a total energy value of each candidate observation point in the set of candidate observation points is determined by using a validity energy function.

In step S350, candidate observation points each of which the total energy value meets a preset standard are used as the target observation points.

In an embodiment, the validity energy function includes a depth energy term, a center energy term and a motion energy term.

The depth energy term is used for determining a degree of closeness between an average depth value of each candidate observation point and a respective target depth value.

The center energy term is used for determining a degree of closeness between a reconstruction model observed at the candidate observation points and a center portion of a captured image.

The motion energy term is used for determining an amount of moving portions in the dynamic scene observed at the candidate observation points.

In an embodiment, the validity energy function is expressed by the following formula:

$$E_t = \lambda_d E_d + \lambda_c E_c + \lambda_m E_m.$$

Here, $E_t$ is a total energy term, Ed is the depth energy term, Ec is the center energy term, Em is the motion energy term, and $\lambda_d$ is a weight coefficient corresponding to the depth energy term, $\lambda_c$ is a weight coefficient corresponding to the center energy term, and $\lambda_m$ is a weight coefficient corresponding to the motion energy term.

The depth energy term, the center energy term and the motion energy term are respectively expressed by the following formulas:

$$E_d = \psi(d_{avg} - d_o)$$

$$E_c = \sum_r \frac{1}{\lambda + du^2} + \frac{1}{\lambda + dv^2}$$

$$E_m = \sum_r \phi_1(r) + \sum_{x_i} \phi_2(x_i)$$

$$\phi_1(r) = \left\| 1 + N_x'(T_c^{-1} t_v - x_n) \right\|_2^2$$

$$\phi_2(x_i) = \left\| \pi(T_V T_C(x_i' - x_i)) \right\|_2^2.$$

Here, $T_c$ denotes poses of the array of drones in the reconstruction model and $T_v$ denotes poses of the candidate observation points in the reconstruction model; $t_v$ denotes translation components of the poses of the candidate observation points; $x_n$ denotes a voxel of the reconstruction model hit by a ray; $N_x$ denotes a normal direction of the voxel; $x_i$ denotes a node to be subjected to non-rigid deformation in the reconstruction model; $x_i'$ denotes a node having been subjected to the non-rigid deformation; $\pi(\ )$ denotes a projection perspective transformation from three-dimensional space to a two-dimensional image plane; $d_{avg}$ denotes an average depth value of each candidate observation point and $d_o$ denotes a respective target depth value; $\psi(\ )$ denotes a penalization term for a distance; r denotes light rays projected from the candidate observation points and passing through the reconstruction model; du and dv denote an average abscissa and an average ordinate of projection pixels of the reconstruction model at each candidate observation point, respectively; $\lambda$ denotes a damping factor; and $\phi 1$ is used for counting motion information of all rays of the candidate observation points and $\phi 2$ is used for counting motion information of all observed deformation nodes.

Through the weighted summation of the depth energy term, the center energy term and the motion energy term, the candidate observation points may be comprehensively evaluated to determine at which observation point the effect of the three-dimensional reconstruction model established by the captured depth image sequences meets the preset standard. That is, the average depth, average center degree and accumulative motion information of the depth images captured at the candidate observation points are comprehensively considered, so that the depth images obtained at the target observation points are more conducive to the reconstruction of the current dynamic scene. In an embodiment, the candidate observation point having the largest total energy value may be selected as the optimal target observation point.

In step S360, the array of drones is instructed to move to the target observation points to capture, and the three-dimensional reconstruction model is updated according to multiple continuous depth image sequences captured by the array of drones at the target observation points.

In the technical scheme of this embodiment, the array of drones is used for capturing the dynamic scene, image fusion is performed according to the captured multiple continuous depth image sequences to obtain the three-dimensional reconstruction model of the dynamic scene, the candidate observation points are calculated and evaluated through the validity energy function to determine the optimal target observation points, and the array of drones is instructed to move to the target observation points to capture, thus not only achieving automatic capturing and reconstruction, but also improving the reconstruction effect of the three-dimensional model. The method is simple and easy to implement, and has broad application prospects.

Embodiment Four

Figure 4:
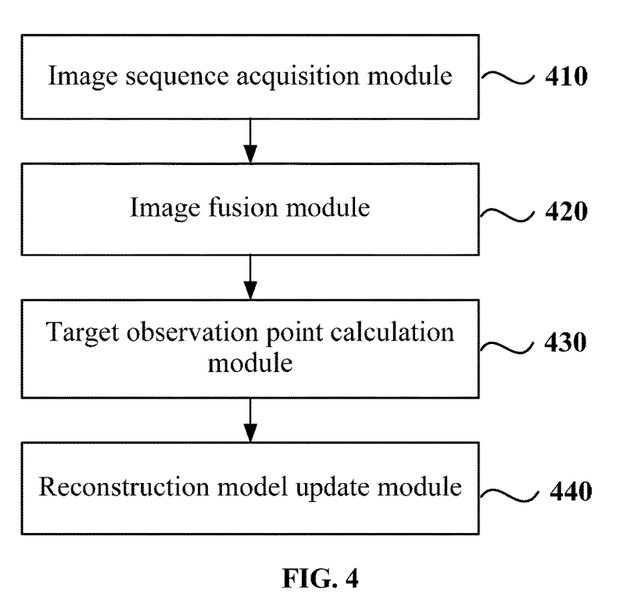
FIG. 4 is a structural diagram of a three-dimensional reconstruction apparatus of a dynamic scene according to embodiment four of the present disclosure.

FIG. 4 is a structural diagram of a three-dimensional reconstruction apparatus of a dynamic scene according to embodiment four of the present disclosure. This embodiment may be applied to the case of three-dimensional reconstruction of a dynamic scene. The dynamic scene, for example, is a scene where a dancer is dancing on a stage. The three-dimensional reconstruction apparatus of the dynamic scene provided in this embodiment of the present disclosure may execute the three-dimensional reconstruction method of the dynamic scene provided in any embodiment of the present disclosure, and has functional modules and beneficial effects corresponding to the executed method. As shown in FIG. 4, the apparatus includes an image sequence acquisition module 410, an image fusion module 420, a target observation point calculation module 430, and a reconstruction model update module 440.

The image sequence acquisition module 410 is configured to acquire multiple continuous depth image sequences of the dynamic scene, where the multiple continuous depth image sequences are captured by an array of drones equipped with depth cameras.

The image fusion module 420 is configured to fuse the multiple continuous depth image sequences to establish a three-dimensional reconstruction model of the dynamic scene.

The target observation point calculation module 430 is configured to determine target observation points of the array of drones according to the three-dimensional reconstruction model and current poses of the array of drones.

The reconstruction model update module 440 is configured to instruct the array of drones to move to the target observation points to capture, and update the three-dimensional reconstruction model according to multiple continuous depth image sequences captured by the array of drones at the target observation points.

In an embodiment, the image sequence acquisition module 410 includes an original image sequence acquisition unit and an image sequence alignment unit.

The original image sequence acquisition unit is configured to acquire multiple original depth image sequences of the dynamic scene captured by the array of drones.

The image sequence alignment unit is configured to align the multiple original depth image sequences according to a synchronization timestamp to obtain the multiple continuous depth image sequences.

In an embodiment, the image fusion module 420 is further configured to fuse the multiple continuous depth image sequences, determine a key frame reconstruction body according to a preset period, and perform, in each preset period, operations described below.

A deformation parameter of a non-rigid deformation node in a current key frame reconstruction body is determined, and a reconstruction model in the current key frame reconstruction body is updated to a current data frame reconstruction body according to the deformation parameter, where the current data frame reconstruction body refers to a real-time reconstruction body at each moment.

The three-dimensional reconstruction model of the dynamic scene is extracted from the current data frame reconstruction body.

The current data frame reconstruction body is used to replace the current key frame reconstruction body to act as a key frame reconstruction body in a next preset period.

In an embodiment, the target observation point calculation module 430 includes a candidate observation point establishment unit, an energy value calculation unit, and a target observation point determination unit.

The candidate observation point establishment unit is configured to rasterize a spatial neighborhood of the array of drones according to the current poses of the array of drones to establish a set of candidate observation points.

The energy value calculation unit is configured to determine a total energy value of each candidate observation point in the set of candidate observation points by using a validity energy function.

The target observation point determination unit is configured to use candidate observation points each of which the total energy value meets a preset standard as the target observation points.

In an embodiment, the validity energy function includes a depth energy term, a center energy term and a motion energy term.

The depth energy term is used for determining a degree of closeness between an average depth value of each candidate observation point and a respective target depth value.

The center energy term is used for determining a degree of closeness between a reconstruction model observed at the candidate observation points and a center portion of a captured image.

The motion energy term is used for determining an amount of moving portions in the dynamic scene observed at the candidate observation points.

In an embodiment, the validity energy function is expressed by the following formula:

$$E_t = \lambda_d E_d + \lambda_c E_c + \lambda_m E_m.$$

Here, $E_t$ denotes a total energy term, Ed denotes the depth energy term, Ec denotes the center energy term, Em denotes the motion energy term, and $\lambda_d$ denotes a weight coefficient corresponding to the depth energy term, $\lambda_c$ denotes a weight coefficient corresponding to the center energy term, and $\lambda_m$ denotes a weight coefficient corresponding to the motion energy term.

The depth energy term, the center energy term and the motion energy term are respectively expressed by the following formulas:

$$E_d = \psi(d_{avg} - d_o)$$

$$E_c = \sum_r \frac{1}{\lambda + du^2} + \frac{1}{\lambda + dv^2}$$

$$E_m = \sum_r \phi_1(r) + \sum_{x_i} \phi_2(x_i)$$

$$\phi_1(r) = \left\| 1 + N_x'(T_c^{-1} t_v - x_n) \right\|_2^2$$

$$\phi_2(x_i) = \left\| \pi(T_V T_C(x_i' - x_i)) \right\|_2^2.$$

Here, $T_c$ denotes poses of the array of drones in the reconstruction model and $T_V$ denotes poses the candidate observation points in the reconstruction model; $t_v$ denotes translation components of the poses of the candidate observation points; $x_n$ denotes a voxel of the reconstruction model hit by a ray; $N_x$ denotes a normal direction of the voxel; $x_i$ denotes a node to be subjected to non-rigid deformation in the reconstruction model; $x_i'$ denotes a node having been subjected to the non-rigid deformation; $\pi()$ denotes a projection perspective transformation from three-dimensional space to a two-dimensional image plane; $d_{avg}$ denotes an average depth value of each candidate observation point and $d_o$ denotes a respective target depth value; $\psi()$ denotes a penalization term for a distance; r denotes light lays projected from the candidate observation points and passing through the reconstruction model; du and dv denote an average abscissa and an average ordinate of projection pixels of the reconstruction model at each candidate observation point, respectively; $\lambda$ denotes a damping factor; and ϕ1 is used for counting motion information of all rays of the candidate observation points and ϕ2 is used for counting motion information of all observed deformation nodes.

In the technical scheme of this embodiment, the array of drones is used for capturing the dynamic scene, and image fusion is performed according to the captured multiple continuous depth image sequences to obtain the three-dimensional reconstruction model of the dynamic scene, so that there is no need to rely on an additional device, and the comfort of the capturer is ensured. Moreover, in the process of reconstruction, the array of drones is instructed in real time, through calculating the target observation points, to move to the target observation points to capture, and the model is updated according to the multiple continuous depth image sequences captured by the array of drones at the target observation points, so as to obtain a more accurate three-dimensional reconstruction model. The method is not restricted by the capturing space, and the reconstruction process can be automatically completed.

Embodiment Five

Figure 5:
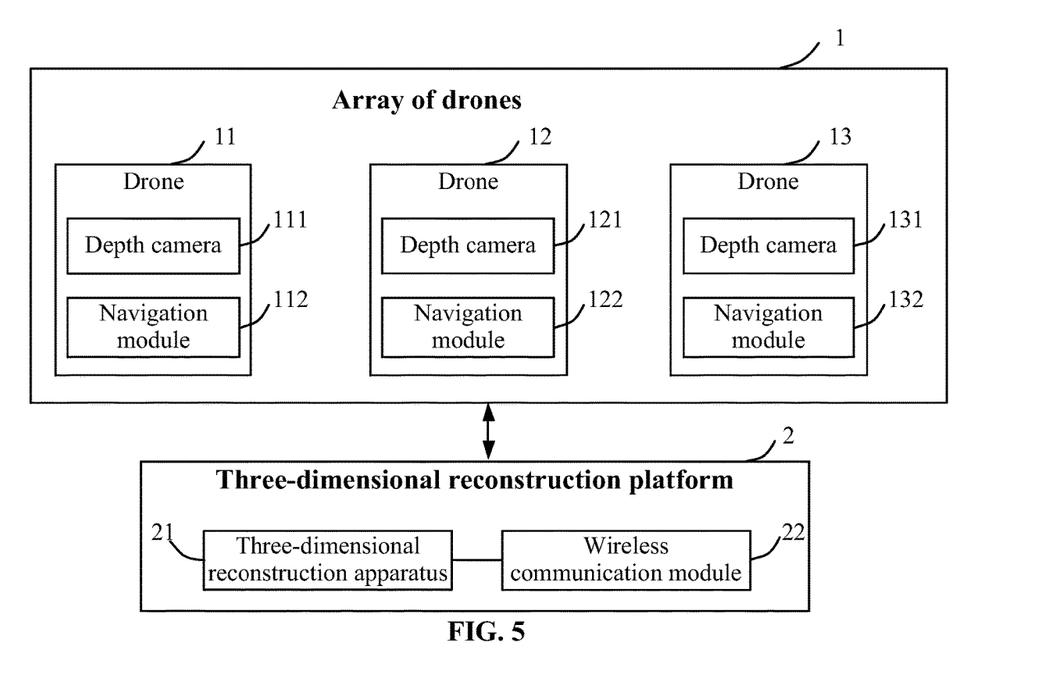
FIG. 5 is a structural diagram of a three-dimensional reconstruction system of a dynamic scene according to embodiment five of the present disclosure.

FIG. 5 is a structural diagram of a three-dimensional reconstruction system of a dynamic scene according to embodiment five of the present disclosure. As shown in FIG. 5, the system includes an array 1 of drones and a three-dimensional reconstruction platform 2.

Each drone in the array 1 of drones is equipped with a depth camera, and the depth camera is configured to capture a depth image sequence of the dynamic scene. Exemplarily, FIG. 5 shows that the array 1 of drones includes three drones, i.e., drone 11, drone 12 and drone 13, but the number of drones in the array of drones is not limited in the embodiments of the present disclosure and may be configured according to actual situations of the dynamic scene to be reconstructed.

The three-dimensional reconstruction platform 2 includes the three-dimensional reconstruction apparatus 21 of the dynamic scene described in any embodiment described above, and is configured to generate a three-dimensional reconstruction model of the dynamic scene according to multiple continuous depth image sequences captured by the array of drones.

In an embodiment, the three-dimensional reconstruction platform 2 further includes a wireless communication module 22 wirelessly connected to the array 1 of drones, where the wireless communication module is configured to receive the multiple continuous depth image sequences captured by the array of drones and is further configured to send position information of target observation points calculated by the three-dimensional reconstruction apparatus 22 to the array 1 of drones.

Correspondingly, each drone in the array 1 of drones further includes a navigation module, where the navigation module is configured to control, according to the position information, the drone to move to a target observation point to capture the dynamic scene.

In the technical scheme of this embodiment, the array of drones is used for capturing the dynamic scene, and image fusion is performed according to the captured multiple continuous depth image sequences to obtain the three-dimensional reconstruction model of the dynamic scene, so that there is no need to rely on an additional device, and the comfort of the capturer is ensured. Moreover, in the process of reconstruction, the array of drones is instructed in real time, through calculating the target observation points, to move to the target observation points to capture, and the model is updated according to the multiple continuous depth image sequences captured by the array of drones at the target observation points, so as to obtain a more accurate three-dimensional reconstruction model. The method is not restricted by the capturing space, and the reconstruction process can be automatically completed.

Embodiment Six

Figure 6:
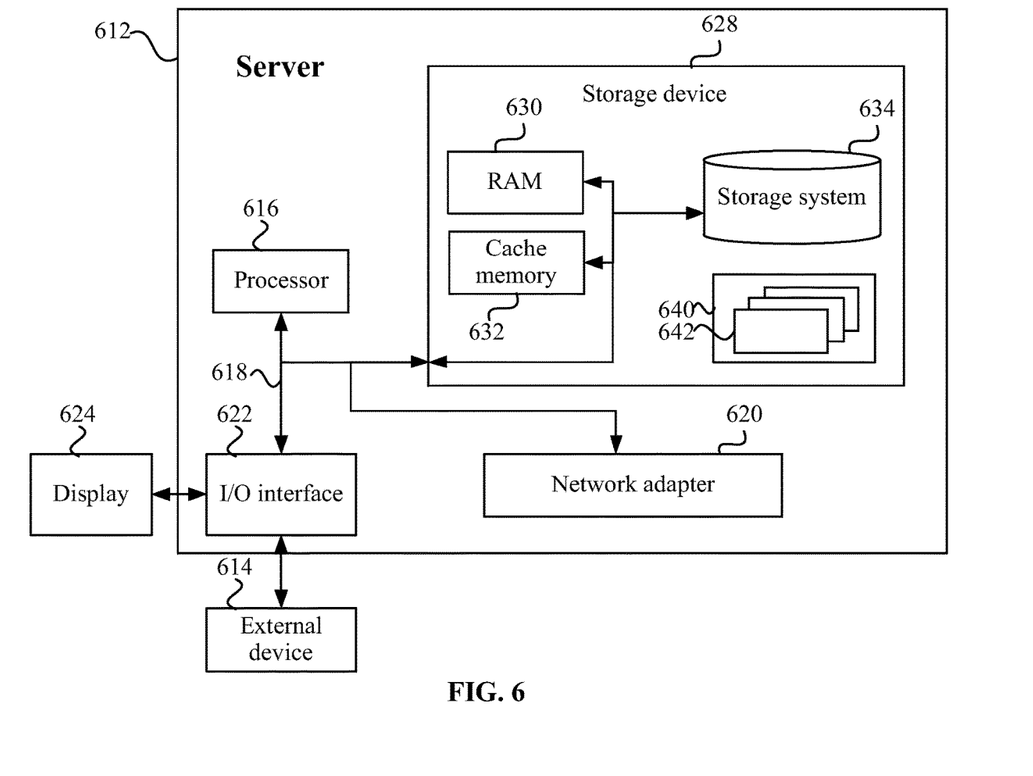
FIG. 6 is a structural diagram of a server according to embodiment six of the present disclosure.

FIG. 6 is a structural diagram of a server according to embodiment six of the present disclosure. FIG. 6 shows a block diagram of an exemplary server 612 for implementing implementations of the present disclosure. The server 612 shown in FIG. 6 is merely an example and does not intend to limit the function and use scope of the embodiments of the present disclosure.

As shown in FIG. 6, the server 612 takes a form of a general-purpose server. Components of the server 612 may include, but are not limited to, one or more processors 616, a storage device 628, and a bus 618 connecting different system components (including the storage device 628 and the processor 616).

The bus 618 represents one or more of several types of bus structures, including a storage device bus or a storage device controller, a peripheral bus, an accelerated graphics port, a processor, or a local bus using any one of the several types of bus structures. By way of example, these architectures include, but are not limited to, an Industry Subversive Alliance (ISA) bus, a Micro Channel Architecture (MCA) bus, an Enhanced ISA bus, a Video Electronics Standards Association (VESA) local bus, and a Peripheral Component Interconnect (PCI) bus.

The server 612 typically includes multiple types of computer system readable media. These media may be any available media that can be accessed by the server 612, including volatile and non-volatile media, and removable and non-removable media.

The storage device 628 may include a computer system readable medium in the form of a volatile memory, such as a random access memory (RAM) 630 and/or a cache memory 632. The server 612 may further include other removable/non-removable, volatile/non-volatile computer system storage media. Merely exemplarily, the storage system 634 may be configured to perform reading and writing on a non-removable non-volatile magnetic medium (not shown in FIG. 6 and usually referred to as a "hard disk driver"). Although not shown in FIG. 6, it is feasible to provide a magnetic disk driver for performing reading and writing on a removable non-volatile magnetic disk (e.g., a "floppy disk"), and an optical disk driver for performing reading and writing on a removable non-volatile optical disk, e.g., a compact disc read-only memory (CD-ROM), a digital video disc-read only memory (DVD-ROM). In such instances, each driver may be connected to the bus 618 by one or more data media interfaces. The storage device 628 may include at least one program product having a group of program modules (e.g., at least one program module). These program modules are configured to perform functions of the embodiments of the present disclosure.

A program/utility 640 having a group of program modules 642 (at least one program module 642) may be stored, for example, in the storage device 628. Such program modules 642 include, but are not limited to, an operating system, one or more applications, other program modules and program data. Each or some combination of these examples may include implementation of a network environment. The program module 642 generally performs functions and/or methods in the embodiments of the present disclosure.

The server 612 may further communicate with one or more external devices 614 (e.g., a keyboard, a pointing device, or a display 624). The server 612 may further communicate with one or more devices that enable a user to interact with the server 612, and/or with any device (e.g., a network card or a modem) that enables the server 612 to communicate with one or more other computing devices. These communications may be performed through an input/output (I/O) interface 622. Moreover, the server 612 may further communicate with one or more networks (e.g., a local area network (LAN), a wide area network (WAN) and/or a public network such as the Internet) through a network adapter 620. As shown in FIG. 6, the network adapter 620 communicates with other modules of the server 612 via the bus 618. It is to be understood that although not shown in the figure, other hardware and/or software modules may be used in conjunction with the server 612. The other hardware and/or software modules include, but are not limited to, microcode, a device driver, a redundant processor, an external disk drive array, a redundant arrays of independent disks (RAID) system, a tape driver, a data backup storage system and the like.

The processor 616 executes a program stored in the storage device 628 to perform various functional applications and data processing, for example, to implement the three-dimensional reconstruction method of the dynamic scene provided by the embodiments of the present disclosure. The method includes the steps described below.

Multiple continuous depth image sequences of the dynamic scene are acquired, where the multiple continuous depth image sequences are captured by an array of drones equipped with depth cameras.

The multiple continuous depth image sequences are fused to establish a three-dimensional reconstruction model of the dynamic scene.

Target observation points of the array of drones are determined according to the three-dimensional reconstruction model and current poses of the array of drones.

The array of drones is instructed to move to the target observation points to capture, and the three-dimensional reconstruction model is updated according to multiple continuous depth image sequences captured by the array of drones at the target observation points.

Embodiment Seven

Embodiment seven of the present disclosure further provides a computer-readable storage medium storing a computer program, where the program, when executed by a processor, implements the three-dimensional reconstruction method of the dynamic scene described in the embodiments of the present disclosure.

Multiple continuous depth image sequences of the dynamic scene are acquired, where the multiple continuous depth image sequences are captured by an array of drones equipped with depth cameras.

The multiple continuous depth image sequences are fused to establish a three-dimensional reconstruction model of the dynamic scene.

Target observation points of the array of drones are determined according to the three-dimensional reconstruction model and current poses of the array of drones.

The array of drones is instructed to move to the target observation points to capture, and the three-dimensional reconstruction model is updated according to multiple continuous depth image sequences captured by the array of drones at the target observation points.

The computer storage medium in this embodiment of the present disclosure may employ any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof more specific examples (non-exhaustive list) of the computer-readable storage medium include: an electrical connection having one or more wires, a portable computer magnetic disk, a hard disk, an RAM, a read only memory (ROM), an erasable programmable read only memory (EPROM or flash memory), an optical fiber, a portable compact disk read only memory (CD-ROM), an optical storage device, a magnetic storage device, or any suitable combination thereof. In this document, the computer-readable storage medium may be any tangible medium including or storing a program. The program may be used by or used in conjunction with an instruction execution system, apparatus or device.

The computer-readable signal medium may include a data signal propagated in a baseband or as part of a carrier, where the data signal carries computer-readable program codes. Such propagated data signal may be in multiple forms, including, but not limited to, an electromagnetic signal, an optical signal or any suitable combination thereof. The computer-readable signal medium may further be any computer-readable medium other than a computer-readable storage medium. The computer-readable medium may send, propagate or transmit the program used by or used in conjunction with the instruction execution system, apparatus or device.

The program codes included on the computer-readable medium may be transmitted on any suitable medium including, but not limited to, wireless, wires, an optical cable, radio frequency (RF), and the like, or any suitable combination thereof.

Computer program codes for performing the operations of the present application may be written in one or more programming languages or a combination thereof, where the programming languages include an object-oriented programming language such as Java, Smalltalk, C++ and further include a conventional procedural programming language such as "C" programming language or similar programming languages. The program codes may be executed entirely on a user computer, partly on the user computer, as a stand-alone software package, partly on the user computer and partly on a remote computer, or entirely on the remote computer or server. In the scenario relating to the remote computer, the remote computer may be connected to the user computer via any type of network, including an LAN or a WAN, or may be connected to an external computer (for example, via the Internet through using an Internet service provider).

What is claimed is:

1. A three-dimensional reconstruction method of a dynamic scene, comprising:
    acquiring a plurality of first continuous depth image sequences of the dynamic scene, wherein the plurality of first continuous depth image sequences are captured by an array of drones, wherein each drone is equipped with a depth camera;
    fusing the plurality of first continuous depth image sequences to establish a three-dimensional reconstruction model of the dynamic scene;
    determining target observation points of the array of drones according to the three-dimensional reconstruction model and current poses of the array of drones; and
    instructing the array of drones to move to the target observation points to capture a plurality of second continuous depth image sequences of the dynamic scene, and updating the three-dimensional reconstruction model according to the plurality of second continuous depth image sequences captured by the array of drones at the target observation points.

2. The method of claim 1, wherein acquiring the plurality of first continuous depth image sequences of the dynamic scene comprises:
    acquiring a plurality of original depth image sequences of the dynamic scene captured by the array of drones; and
    aligning the plurality of original depth image sequences according to a synchronization timestamp to obtain the plurality of first continuous depth image sequences.

3. The method of claim 1, wherein fusing the plurality of first continuous depth image sequences to establish the three-dimensional reconstruction model of the dynamic scene comprises:
    fusing the plurality of first continuous depth image sequences, determining a key frame reconstruction body according to a preset period, and performing, in each preset period, following operations:
    determining a deformation parameter of a non-rigid deformation node in a current key frame reconstruction body, and updating a reconstruction model in the current key frame reconstruction body to a current data frame reconstruction body according to the deformation parameter, wherein the current data frame reconstruction body refers to a real-time reconstruction body at each moment;
    extracting the three-dimensional reconstruction model of the dynamic scene from the current data frame reconstruction body; and
    using the current data frame reconstruction body to replace the current key frame reconstruction body to act as a key frame reconstruction body in a next preset period.

4. The method of claim 1, wherein determining the target observation points of the array of drones according to the three-dimensional reconstruction model and the current poses of the array of drones comprises:
    rasterizing a spatial neighborhood of the array of drones according to the current poses of the array of drones to establish a set of candidate observation points;
    determining a total energy value of each candidate observation point in the set of candidate observation points by using a validity energy function; and
    using candidate observation points each of which the total energy value meets a preset standard as the target observation points.

5. The method of claim 4, wherein the validity energy function comprises a depth energy term, a center energy term and a motion energy term;
    wherein the depth energy term is used for determining a degree of closeness between an average depth value of each candidate observation point and a respective target depth value;
    the center energy term is used for determining a degree of closeness between a reconstruction model observed at the candidate observation points and a center portion of a captured image; and
    the motion energy term is used for determining an amount of moving portions in the dynamic scene observed at the candidate observation points.

6. The method of claim 5, wherein the validity energy function is expressed by a following formula:

$E_t = \lambda_d E_d + \lambda_c E_c + \lambda_m E_m$ wherein $E_t$ denotes a total energy term, Ed denotes the depth energy term, Ec denotes the center energy term, Em denotes the motion energy term, and $\lambda_d$ denotes a weight coefficient corresponding to the depth energy term, $\lambda_c$ denotes a weight coefficient corresponding to the center energy term, and $\lambda_m$ denotes a weight coefficient corresponding to the motion energy term; and the depth energy term, the center energy term and the motion energy term are respectively expressed by following formulas:

$$E_d = \psi(d_{avg} - d_o)$$

$$E_c = \sum_r \frac{1}{\lambda + du^2} + \frac{1}{\lambda + dv^2}$$

$$E_m = \sum_r \phi_1(r) + \sum_{x_i} \phi_2(x_i)$$

$$\phi_1(r) = \left\| 1 + N'_x \left(T_c^{-1} t_v - x_n\right) \right\|_2^2$$

$$\phi_2(x_i) = \left\| \pi(T_V T_C(x'_i - x_i)) \right\|_2^2$$

wherein $T_c$ denotes poses of the array of drones in the reconstruction model and $T_V$ denotes poses of the candidate observation points in the reconstruction model; $t_v$ denotes translation components of the poses of the candidate observation points; $x_n$ denotes a voxel of the reconstruction model hit by a ray; $N_x$ denotes a normal direction of the voxel; $x_i$ denotes a node to be subjected to non-rigid deformation in the reconstruction model; $x_i'$ denotes a node having been subjected to the non-rigid deformation; $\pi(\ )$ denotes a projection perspective transformation from three-dimensional space to a two-dimensional image plane; $d_{avg}$ denotes an average depth value of each candidate observation point and $d_o$ denotes a respective target depth value; $\psi(\ )$ denotes a penalization term for a distance; r denotes light rays projected from the candidate observation points and passing through the reconstruction model; du and dv denote an average abscissa and an average ordinate of projection pixels of the reconstruction model at each candidate observation point, respectively; $\lambda$ denotes a damping factor; and $\phi 1$ is used for counting motion information of all rays of the candidate observation points and $\phi 2$ is used for counting motion information of all observed deformation nodes.

7. A three-dimensional reconstruction apparatus of a dynamic scene, comprising:
at least one processor; and
a memory communicatively connected to the at least one processor;
wherein the memory stores instructions executable by the at least one processor, and the at least one processor is configured to execute the instructions to:
acquire a plurality of first continuous depth image sequences of the dynamic scene, wherein the plurality of first continuous depth image sequences are captured by an array of drones, wherein each drone is equipped with a depth camera;
fuse the plurality of first continuous depth image sequences to establish a three-dimensional reconstruction model of the dynamic scene;
determine target observation points of the array of drones according to the three-dimensional reconstruction model and current poses of the array of drones; and instruct the array of drones to move to the target observation points to capture a plurality of second continuous depth image sequences of the dynamic scene, and update the three-dimensional reconstruction model according to the plurality of second continuous depth image sequences captured by the array of drones at the target observation points.

8. The apparatus of claim 7, wherein the at least one processor is configured to execute the instructions to acquire the plurality of first continuous depth image sequences of the dynamic scene in the following manners:
acquiring a plurality of original depth image sequences of the dynamic scene captured by the array of drones; and
aligning the plurality of original depth image sequences according to a synchronization timestamp to obtain the plurality of first continuous depth image sequences.

9. The apparatus of claim 7, wherein the at least one processor is configured to execute the instructions to fuse the plurality of first continuous depth image sequences to establish the three-dimensional reconstruction model of the dynamic scene in the following manners:
fusing the plurality of first continuous depth image sequences, determining a key frame reconstruction body according to a preset period, and performing, in each preset period, following operations:
determining a deformation parameter of a non-rigid deformation node in a current key frame reconstruction body, and updating a reconstruction model in the current key frame reconstruction body to a current data frame reconstruction body according to the deformation parameter, wherein the current data frame reconstruction body refers to a real-time reconstruction body at each moment;
extracting the three-dimensional reconstruction model of the dynamic scene from the current data frame reconstruction body; and
using the current data frame reconstruction body to replace the current key frame reconstruction body to act as a key frame reconstruction body in a next preset period.

10. The apparatus of claim 7, wherein the at least one processor is configured to execute the instructions to determine the target observation points of the array of drones according to the three-dimensional reconstruction model and the current poses of the array of drones in the following manners:
rasterizing a spatial neighborhood of the array of drones according to the current poses of the array of drones to establish a set of candidate observation points;
determining a total energy value of each candidate observation point in the set of candidate observation points by using a validity energy function; and
using candidate observation points each of which the total energy value meets a preset standard as the target observation points.

11. The apparatus of claim 10, wherein the validity energy function comprises a depth energy term, a center energy term and a motion energy term;
wherein the depth energy term is used for determining a degree of closeness between an average depth value of each candidate observation point and a respective target depth value;
the center energy term is used for determining a degree of closeness between a reconstruction model observed at the candidate observation points and a center portion of a captured image;

and the motion energy term is used for determining an amount of moving portions in the dynamic scene observed at the candidate observation points.

12. The apparatus of claim 11, wherein the validity energy function is expressed by a following formula:

$$E_t = \lambda_d E_d + \lambda_c E_c + \lambda_m E_m$$

wherein $E_t$ denotes a total energy term, Ed denotes the depth energy term, Ec denotes the center energy term, Em denotes the motion energy term, and $\lambda_d$ denotes a weight coefficient corresponding to the depth energy term, $\lambda_c$ denotes a weight coefficient corresponding to the center energy term, and $\lambda_m$ denotes a weight coefficient corresponding to the motion energy term; and the depth energy term, the center energy term and the motion energy term are respectively expressed by following formulas:

$$E_d = \psi(d_{avg} - d_o)$$

$$E_c = \sum_r \frac{1}{\lambda + du^2} + \frac{1}{\lambda + dv^2}$$

$$E_m = \sum_r \phi_1(r) + \sum_{x_i} \phi_2(x_i)$$

$$\phi_1(r) = \left\| 1 + N_x'(T_c^{-1} t_v - x_n) \right\|_2^2$$

$$\phi_2(x_i) = \left\| \pi(T_V T_C(x_i' - x_i)) \right\|_2^2$$

wherein $T_c$ denotes poses of the array of drones in the reconstruction model and $T_V$ denotes poses of the candidate observation points in the reconstruction model; $t_v$ denotes translation components of the poses of the candidate observation points; $x_n$ denotes a voxel of the reconstruction model hit by a ray; $N_x$ denotes a normal direction of the voxel; $x_i$ denotes a node to be subjected to non-rigid deformation in the reconstruction model; $x_i'$ denotes a node having been subjected to the non-rigid deformation; $\pi(\ )$ denotes a projection perspective transformation from three-dimensional space to a two-dimensional image plane; $d_{avg}$ denotes an average depth value of each candidate observation point and $d_o$ denotes a respective target depth value; $\psi(\ )$ denotes a penalization term for a distance; r denotes light rays projected from the candidate observation points and passing through the reconstruction model; du and dv denote an average abscissa and an average ordinate of projection pixels of the reconstruction model at each candidate observation point, respectively; $\lambda$ denotes a damping factor; and $\phi 1$ is used for counting motion information of all rays of the candidate observation points and $\phi 2$ is used for counting motion information of all observed deformation nodes.

13. A three-dimensional reconstruction system of a dynamic scene, comprising an array of drones and a three-dimensional reconstruction platform;
wherein each drone in the array of drones is equipped with a depth camera, and the depth camera is configured to capture a depth image sequence of the dynamic scene; and
the three-dimensional reconstruction platform comprises the three-dimensional reconstruction apparatus of the dynamic scene according to claim 7, and is configured to generate a three-dimensional reconstruction model of the dynamic scene according to a plurality of continuous depth image sequences captured by the array of drones.

14. The system of claim 13, wherein
the three-dimensional reconstruction platform further comprises a wireless communication module wirelessly connected to the array of drones, wherein the wireless communication module is configured to receive the plurality of continuous depth image sequences captured by the array of drones and is further configured to send position information of target observation points determined by the three-dimensional reconstruction apparatus to the array of drones; and
each drone in the array of drones further comprises a navigation module, wherein the navigation module is configured to control, according to the position information, the drone to move to a target observation point to capture the dynamic scene.

15. A server, comprising:
at least one processor; and
a storage device, which is configured to store at least one program;
wherein the at least one program, when executed by the at least one processor, causes the at least one processor to implement the three-dimensional reconstruction method of the dynamic scene of claim 1.

16. A non-transitory computer-readable storage medium, storing a computer program, wherein the computer program, when executed by a processor, implements the three-dimensional reconstruction method of the dynamic scene of claim 1.

17. The method of claim 2, wherein fusing the plurality of first continuous depth image sequences to establish the three-dimensional reconstruction model of the dynamic scene comprises:
fusing the plurality of first continuous depth image sequences, determining a key frame reconstruction body according to a preset period, and performing, in each preset period, following operations:
determining a deformation parameter of a non-rigid deformation node in a current key frame reconstruction body, and updating a reconstruction model in the current key frame reconstruction body to a current data frame reconstruction body according to the deformation parameter, wherein the current data frame reconstruction body refers to a real-time reconstruction body at each moment;
extracting the three-dimensional reconstruction model of the dynamic scene from the current data frame reconstruction body; and
using the current data frame reconstruction body to replace the current key frame reconstruction body to act as a key frame reconstruction body in a next preset period.

18. The apparatus of claim 8, wherein the at least one processor is configured to execute the instructions to fuse the plurality of first continuous depth image sequences to establish the three-dimensional reconstruction model of the dynamic scene in the following manners:
fusing the plurality of first continuous depth image sequences, determining a key frame reconstruction body according to a preset period, and performing, in each preset period, following operations:
determining a deformation parameter of a non-rigid deformation node in a current key frame reconstruction body, and updating a reconstruction model in the current key frame reconstruction body to a current data frame reconstruction body according to the deformation parameter, wherein the current data frame reconstruction body refers to a real-time reconstruction body at each moment;

extracting the three-dimensional reconstruction model of the dynamic scene from the current data frame reconstruction body; and using the current data frame reconstruction body to replace the current key frame reconstruction body to act as a key frame reconstruction body in a next preset period.

19. A three-dimensional reconstruction system of a dynamic scene, comprising an array of drones and a three-dimensional reconstruction platform;

wherein each drone in the array of drones is equipped with a depth camera, and the depth camera is configured to capture a depth image sequence of the dynamic scene; and the three-dimensional reconstruction platform comprises the three-dimensional reconstruction apparatus of the dynamic scene according to claim 8, and is configured to generate a three-dimensional reconstruction model of the dynamic scene according to a plurality of continuous depth image sequences captured by the array of drones.

20. A three-dimensional reconstruction system of a dynamic scene, comprising an array of drones and a three-dimensional reconstruction platform;

wherein each drone in the array of drones is equipped with a depth camera, and the depth camera is configured to capture a depth image sequence of the dynamic scene; and the three-dimensional reconstruction platform comprises the three-dimensional reconstruction apparatus of the dynamic scene according to claim 9, and is configured to generate a three-dimensional reconstruction model of the dynamic scene according to a plurality of continuous depth image sequences captured by the array of drones.

* * * * *